United States Patent [19]

McNair et al.

[11] 4,068,681
[45] Jan. 17, 1978

[54] LIQUID PROPORTIONING DEVICE

[75] Inventors: Hugh Noel McNair, Fruitland Park; Stuart William Olson, Leesburg, both of Fla.

[73] Assignee: Hydro Mix, Inc., Lebanon, N.J.

[21] Appl. No.: 621,568

[22] Filed: Oct. 10, 1975

[51] Int. Cl.² ............................................. F16K 19/00
[52] U.S. Cl. ................... 137/588; 137/202; 137/599.1; 137/604; 239/317
[58] Field of Search ............................ 23/272.7, 272.8; 137/202, 268, 587, 588, 599, 599.1, 604; 239/310, 317, 318

[56] References Cited
U.S. PATENT DOCUMENTS

| 2,425,070 | 8/1947 | Nicolette | 137/202 |
| 2,613,994 | 10/1952 | Peters | 23/272.7 X |
| 2,737,414 | 3/1956 | Wenzel | 239/317 |
| 2,856,234 | 10/1958 | McNair | 137/584 |
| 2,944,561 | 7/1960 | Sellati | 23/272.8 X |
| 3,926,370 | 12/1975 | Vandervelden | 239/317 X |

Primary Examiner—Robert G. Nilson
Attorney, Agent, or Firm—John C. La Prade

[57] ABSTRACT

The Improved Liquid Proportioning Device of this invention comprises a combination of all the features of the liquid proportioning device set forth in Applicant's prior U.S. Pat. No. 2,856,234 with the addition of a closure device including air vent means equipped with a float valve. The air vent may, in one embodiment work in combination with a flow-diverting conduit, where closure means are provided for the air vent and the flow-diverting conduit.

12 Claims, 2 Drawing Figures

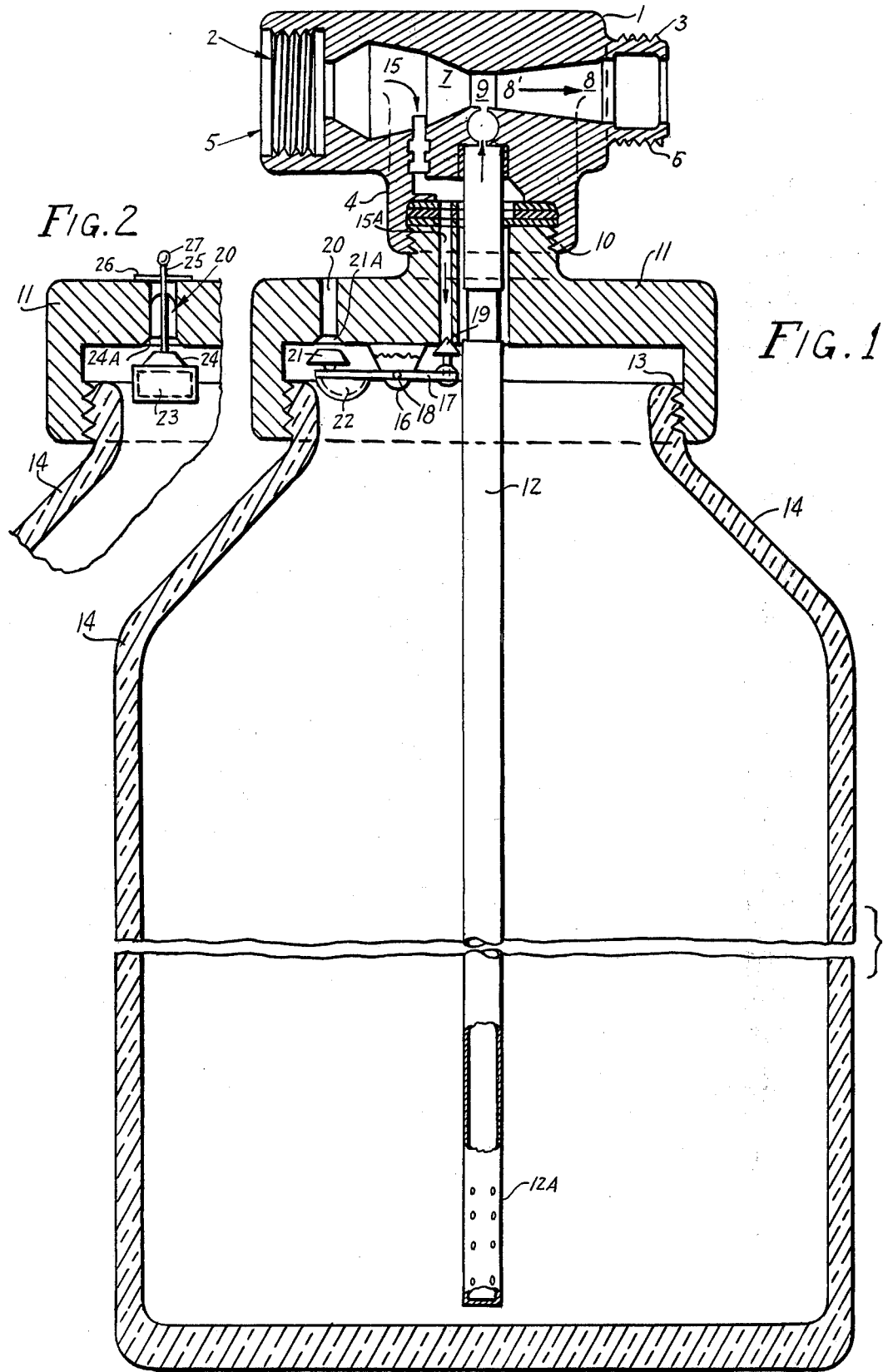

LIQUID PROPORTIONING DEVICE

In one preferred embodiment of the invention the proportioning device may be equipped with suitable means for supply of liquid to the mixing container. Such means of supply equipted with mixing jets facilitate mixing of the chenical concentrate with a liquid carrier, such as water or some other particular liquid vehicle by increasing the velocity of the incoming liquid so that mixing will be properly enhanced.

OBJECTS OF THE INVENTION

This invention also relates to apparatus designed to provide a combined main conduit member, closure member and proportioning device wherein the closure member is equipted with a suitable air vent and closure structure so as to allow the user to place a predetermined quantity of concentrated chemicals, such as water soluble fertilizer crystals into the empty container, connect the main conduit to a garden hose or any other suitable liquid vehicle supply means that supplys water, or other vehicle so as to thereby mix the chemical concentrate in the container which constitutes a considerable improvement over the inventions set forth in applicants prior U.S. Pat. No. 2,856,234.

This invention also comprises means to provide an air and float control valve means that automatically closes the air vent of the improved proportioning device when the initial mixing cycle is completed, so as to automatically reverse the flow of liquid vehicle and thereby start the proportioning operation. This invention also relates to means to provide a siphon to make the container self empting of the liquid vehicle remaining therein, when the main supply of liquid vehicle is shut off.

BACKGROUND OF THE INVENTION

In the prior art liquid proportioning device disclosed in applicant prior U.S. Pat. No. 2,856,234 there was no means provided for mixing the chemical concentrate within the attached container. In other words, in the prior art device, disclosed in U.S. Pat. No. 2,856,234 a premixed chemical solution was supplied to the container. This obviously has many apparent disadvantages. The ability of an operator to place a few ounces of a solid, crystaline fertilizer or insecticide or a concentrated liquid into the container and then attach the new improved proportioning device to a water supply is most attractive. This feature is available in the novel device of this invention.

It is one principal object of this invention to provide an improved liquid proportioning device that will solve the practical problems of the use and application of the prior art device disclosed in U.S. Pat. No. 2,856,234.

It is another object of this invention to provide adaquate air vent and air vent closure means that combine and cooperate with the flow diverting conduit used to proportion the liquid concentrate.

It is a further object of this invention to provide superior method and apparatus for mixing a chemical concentrate in the supply container with a liquid diluent, which will usually be water supplied by an ordinary garden hose.

It is an additional object of this invention to provide a combination of air venting means for the closure devices disclosed in the prior art U.S. No. 2,856,234 and to use such air venting means in combination with pivoted valve means that cause cooperation between the air venting means and the prior art proportioning means disclosed in U.S. Pat. No. 2,856,234.

It is a further object, of this invention to provide a device that will automatically permit a supply container that is partially filled with a chemical concentrate to dissolve and/or dilute said chemical concentrate and fill the supply container with dissolved or diluted concentrate, and when the supply container had been filled therewith to proceed without any adjustment or manual manipulation to proportion said dissolved or diluted concentrate into the main flow of liquid such as water at a predetermined ratio without further dilution.

It is another object of this invention to provide a device wherein if the main flow of liquid is turned off the supply container being emptied of the concentrate and filled with the main flow liquid will without further manual manipulation drain the main flow liquid from the supply container by a syphoning action.

It is also an object of this invention to provide a device wherein the proportioning action can be stopped without interruption to the main flow.

THE DRAWINGS

FIG. 1 of the drawings is a full view taken along a vertical plane so as to illustrate a symetrical section of the entire device.

FIG. 2 is a partical section view of the float valve illustrating only the valve mechanism. FIG. 2 illustrates a modification of the valve shown in FIG. 1.

DESCRIPTION OF THE PREFERRED EMBODIMENT

Referring more particularly to the features of the invention embodied in the modification shown by the various figures of the drawings, FIG. 1, as previously indicated, comprises an optimum embodiment of the device and is primarily intended for the adaptation of the usual type of chemical concentrate having a specific gravity at least equal to or in excess of the liquid vehicle which is usually water. Other fluids may be used, and in the event that the fluid has a specific gravity less than water the relative lengths of conduit 15-A and 12 can be reversed or if the fluid is a non water misciable oil based material conduit 12 may terminate at the base of closure device 11. The invention therefore is applicable to the use of all types of fluids which manifest the characteristics of permitting the vehicle such as water to overlay or underlay thereon without turbulance or emulsification where the vehicle is supplied pursuant to the quiescent layering of the present invention.

The header unit 4 with a main conduit 1 may desirably comprise a straight line section of conduit 1 adapted for attachment at its end 2 to a source of vehicle supply such as a water hose or other water supply. The longitudinal portion 3 may be threaded to accomodate a nozzle type spigot or a flexible hose or any other discharging device that is desirable. It is, however, stated that there is not intent, whatever, to restrict the configuration of the conduit 1 or the correlation of parts 2 and 3 thereof to any particular design, especially in view of the wide and diversified adaptations of the invention. All of the disclosure of U.S. Pat. No. 2,856,234 is herewith incorporated by reference.

A preferred fabrication of header 4 and an essentially straight line conduit 1 is that of a unitary casting which may be of any desirable material, such as metal, rubber, synthetic resin or plastic by way of illustration. As shown in FIGS. 1–2, the casting expediently comprises a plastic or synthetic design by way of illustration.

It will, however, be apparent that the various parts of the device, such as conduit 1 header 4 and metering jet 15 may be separate individual members correlated in any expedient manner known to the art.

The said end 2 of conduit 1 may desirably be externally or internally threaded for correlation with a connector or a hose coupling member as is desired. An internally threaded coupling 5 may be likewise designated to effect the attachment to the conduit 2, a water line or any other pressurized fluid, as aforesaid.

The outlet end of the conduit 3 may be externally threaded as shown in FIG. 1, if desired, and may be used with any appropriate coupling means similar to that indicated at end 3. The external threads 6 may be attached to any suitable nozzle or to any other desired coupling egress means.

Within conduit 1 a flow restricting means comprising a modified venturi is provided. The inlet and high pressure side 7 and the outlet or low pressure side 8, together with the area of maximum resistance at the throat 9 is designed in such a manner as to create only a minor pressure differential between the high pressure side 7 and the throat 9. It is an essential part of this invention that when dispensing the concentrate there will be always a positive pressure exerted at the throat 9 on the fluid passing through conduit 12. This pressure being only slightly less than the pressure exerted on the by-passed water entering the supply vessel through conduit 15-A.

In the general illustration of the invention a fluid such as water is forced at high pressure through conduit 1 entering through coupling 5. By the action of the modified venturi a fluid such as any liquified fertilizer or insecticide is forced by the displacement of the volume of the diverted liquid supplied through line 15-A up through conduit 12 and mixes with the water at throat 9.

When in operation, water from the high pressure side of the modified venturi is forced through a metering jet 15 into conduit 15-A and flows into supply container 14 by flowing around valve closure member 19. This creates a displacement of a certain volume of concentrate from container 14 into the main stream of flow through conduit 1.

The amount of such water flowing into supply container 14 is controlled by a metering jet 15. The relation of the diameter of the orifice of the metering jet to the diameter of a throat 9 of the modified venturi determines the relative amount or percentage of the concentrate to the main stream of water into which it is injected. Broadly speaking, and subject to some adjustment, if the area of the throat 9 is one hundred times greater than the area of the orifice of the metering jet 15 a concentration of 1% will be achieved over a widely varied range of pressures and flows. Obviously a variety of different jets of varying size may be substituted for jet 15.

Because there is a positive pressure at throat 9 no more of the concentrate can enter the main stream than the amount being displaced by the amount of water passing into the supply container through the metering jet 15. It should be understood that the metering jet could be located at any point in the ingress conduit or in conduit 12.

It should be further understood that when proportioning the contents of the supply container into the main stream the entire system is under pressure and therefore must be sealed to the atmosphere.

As certain chemicals such as water soluable fertilizers and insecticides are marketed in granular or powder form that must be dissolved in water before becoming a liquid concentrate one purpose of this invention is to facilitate the use of such granular or powdered materials by automatically dissolving them in the supply container prior to proportioning. This is accomplished in the following manner.

A given amount of the dry granuals or powder is placed in the empty supply container which is then attached to the closure device 11. The water is then turned on at full pressure. As the interior of the supply container is at atmospheric pressure, water from the main stream is forced down conduit 12 at high pressure. Egress through the bottom of conduit 12 is confined to a plurality of small orifices 12-A which produce a series of high velocity streams which create the agitation and turbulance necessary to desolve the dry material and convert it into a liquid concentrate. This could also apply to highly concentrated liquids that require dilution before injection into the main stream.

As the water enters the supply container through conduit 12 it displaces the air already in the container, which is allowed to escape through air vent 20 which is open due to the gravitational pull of float member 22. When however, the liquid level reaches the float, the float rises and seals off air vent 20 by closing valve 21 thus permitting the supply container to be pressurized.

At this point in time the proportioning conduit 15-A supplies a small amount of liquid that displaces an equal quantity of chemical concentrate into the main stream and thereby the flow through conduit 12 is reversed.

The float member 22 may be of any one of various configuration, such as a semispherical or a rectangular or circular plate of a bouyant material, that may be floated on the chemical concentrate.

An alternative air vent valve mechanism is shown in FIG. 2 where a float valve is employed. The valve closure member 24 is raised into a closed position by the force of the rising liquid on float 23 and maintained in said closed position by the internal pressure of the supply container. The valve may have a rod (FIG. 2) 25 extending up through the closure 11 with an appropriate termination 27 that would permit the valve closure member 24 to be opened manually from the outside of closure device 11 so as to release the pressure in the supply container when the system is shut off and the pressure has not been released elsewhere. Valve 21 may be similarly equipped.

It will be understood that when the liquid concentrate in the supply container is exhausted the supply container will be full of plain water. It would therefore be a convenience under most circumstances if the water could be automatically drained out of the supply container so that it could be more readily refilled.

This can be accomplished when the egress end of the device 3 is attached to a length of hose that terminates in an open nozzle or sprinkler device at an elevation equal to or lower than the supply container and when the float valve assembly as opposed to the float valve is employed as illustrated in FIG. 2. The automatic siphoning action can be accomplished with the float valve asembly shown in FIG. 1. Automatic siphoning cannot be accomplished with the float valve in FIG. 2 because by pass 15 may be open to the atmosphere. When the water is turned off at the source a syphoning action will be set up that will draw the water up through conduit 12. This syphoning action to be continuous however, requires that air be admitted into the supply container so that a counter vacuum is not created therein and that this air does not pass up conduit 15-A into the main conduit thus breaking the syphoning action. These two prerequisities are obtained simultaneously by the action of valve closure members 21 and 19. As the water level is lowered due to the initial syphoning action, the float valve 21 drops thereby allowing air to enter the supply vessel through air vent 20 and at the same time valve 19 closes conduit 15-A to any passage of air into the main conduit 1.

OPERATION OF THE IMPROVED LIQUID PROPORTIONING DEVICE AND CONTAINER COMBINATION

One of the principal advantages of the improved proportioning device when considered in combination with the container is that any person desiring to fertilize a lawn or supply a liquid insecticide may take the container 14 remove the closure device 11 and associated conduit member 1 that may be molded together as a single unitary structure from a suitable plastic material. The operator may in the initial step place a given amount of powdered, granular or crystalline material into container 14. The closure device 11 with associated depending conduit 12 is then replaced on the container and the closure member 11 may be by means of screw threads 13 reattached and fastened to container 14. Other equivalent closure means may be used rather than the screw threads 13. When water or another liquid vehicle is turned on and allowed to flow through conduit 1 to a rapid turbulent mixing operation will take place within container 14. The small jets 12-A will serve to facilitate and enhance the mixing operation that will proceed in container 14. As the mixing operation continues container 14 becomes filled. When container 14 has filled to the level of float 22 it is obvious from the drawings particularly FIG. 1 that the float 22 will cause air vent closure member 21 to close air vent 20.

With the closure of air vent 20 and while the water is still flowing through conduit 1 container 14 becomes pressurized and the flow through conduit 12 will be reversed and the proportioning device shall displace the concentrate from container 14. The proportioning device by means of proportioning jet 15 and the associated diverting conduit 15-A will deliver a predetermined quanity of the liquid vehicle that will usually be water to container 14. Therefore volume for volume displacement of the concentrated liquid in container 14 will be displaced from container 14 and will flow upward through conduit 12 so as to be introduced into the main stream through conduit 1.

In the preferred embodiment the metering jet, for purposes for illustration only, the area of the inlet metering jet 15 is 1/100th the area of throat 9. It would be obvious that 1/100th of the volumetric flow of water or other liquid vehicle through conduit 1 flow through the proportioning jet and diverting conduit 15-A thereby diverting and proportioning the liquid chemical concentrate within the container 14 at a ratio of 100 parts vehicle to 1 part of chemical concentrate.

If complete emptying of container 14 is not desired there is no need to correlate the flowing through metering jet 15 and flow diverting orifices 15-A with the pivot valve closure means of FIG. 1 and the slug valve mechanism illustrated in FIG. 2 may be used in place thereof.

In FIG. 2 the float member 23 has affixed to its upper surface a valve closure member 24 designed to fit within the confines of the valve seat 24-A. When the liquid raises the base of the float member 23 the valve closure member 24 will seat into and close the air vent 20 by means of securing the valve closure member 24 within the valve seat 24-A. As illustrated in FIG. 2 a plate 26 with a vertical rod associated therewith and extending through an opening therein may serve to line the valve closure member and associated float valve 23 with the valve seat 24-A. The plate 26 does not at any time block opening 20. The plate 26 serves only to support the float valve structure 23 and 24, rod 25 and pull ring 27. The float valve assembly comprising elements 23 and 24 is designed to close vent 20 when the liquid level lifts float 23. The float valve assembly comprising elements 23 and 24 is considered equivalent to the float valve assembly comprised of elements 22 and 21 in FIG. 1.

It should be understood that the rod 25 may be mounted on the similar valve closure means 21 illustrated in FIG. 1.

It should be understood that the various valve closure members with the float valve member 22, as shown in FIG. 1 and the similar float valve 23 shown in FIG. 2 are interchangable and considered to be equivilent for purposes of this invention.

It is by means of the disclosed air vent and associated valve closure members and the supporting hardware including pivot members 17 and the supporting structure comprising pivot members 16, 17 and 18 as well as the air vent valve assembly shown in FIG. 2 that allow the proportioning device and container to operate in a manner to allow mixing to occur in the container 14 whereas no such mixing was possible in the prior art proportioning device that was disclosed in applicant's prior art U.S. Pat. No. 2,856,234.

The foregoing detailed description is to be clearly understood as given by way of illustration and example only, the spirit and scope of this invention being limited solely by the appended claims.

We claim:
1. In the apparatus comprising an attachment device applicable to a container and adapted for the proportioned admixture and dispensing of liquids, a main conduit, a venturi in said main conduit for effecting a pressure differential determining high and low pressure sides thereof during the flow of liquid therethrough, a flow diverting conduit connected with the high pressure side of the main conduit and adapted to supply a diverted flow of liquid from the said main conduit to the container, a conduit connected with the throat portion of the venturi in the said main conduit, a metering jet having an orifice inlet and a passage of greater diameter relative to the said orifice, the said jet comprising the inlet end portion of said flow-diverting conduit, the said orifice being of a predetermined ratio relative to the venturi throat portion, the relationship of the said orifice to the venturi throat portion being adapted to afford a substantially fixed ratio through a wide range of pressures and flows in the said main conduit, a header adapted for attachment to a container, both the said flow-diverting conduit and the said conduit connected with the throat portion of the venturi extending through the said header, wherein the said header is equipped with suitable air vent means to allow the escape of air during the initial filling of the container with the liquid that initially flows through the main conduit, and wherein the said header member is equipped at its base with a container closure member and wherein the closure member is fitted on its lower side with a pivot support member and two connected valve closure members each suitably designed to alternately close the flow-diverting conduit and the air vent means.

2. The apparatus of claim 1 wherein the said metering jet can be removable and replacable to permit predetermined changes in the proportioning concentration.

3. The apparatus of claim 1 wherein the conduit connected with the throat portion of the venturi is equipted with a plurality of small orifices at or near its lower end to facilate mixing of the carrier vehicle or liquid with the chemical concentrate initially placed in the container.

4. The apparatus of claim 1 wherein the valve closure member that is designed to close the air vent is fitted with a manually operable pull member so as to allow manual operation of the valve closure means that control the flow of air through the air vent and flow diverting conduit.

5. The apparatus of claim 1 wherein the valve closure structure comprises a float.

6. An apparatus comprising the combination of a wide mouth container and improved liquid proportioning and dispensing device wherein the proportioning and dispensing device consists of a main conduit, a venturi in said main conduit for effecting a pressure differential determining high and low pressure sides thereof during the flow of liquid therethrough, a flow-diverting conduit connected with the high pressure side of the main conduit and adapted to supply a diverted flow of liquid from the said main conduit to the container, a conduit connected with the throat portion of the venturi in the said main conduit, a jet having an orifice inlet and a passage of sufficient diameter relative to the said orifice, said jet comprising the inlet end portion of said flow-diverting conduit, said orifice being of a predetermined ratio relative to the venturi throat portion and being adapted to afford a substantially fixed ratio through a wide range of pressures and flows in the main conduit, a container closure member having a base equipped with a suitable air vent opening and with a pivoted rod member designed to support valve closure structure comprising a valve closure member designed to close the said air vent when the flow diverting conduit is open to allow closure of the flow-diverting conduit when the air vent is open.

7. The apparatus of claim 6 wherein the said metering jet is removable and replacable to permit predetermined changes in the proportioning concentration.

8. The apparatus of claim 6 wherein the conduit connected with the throat portion of the venturi is equipped with a plurality of small orifices at or near its lower end to facilate mixing constituents.

9. The apparatus of claim 6 wherein the valve closure member that is designed to close the air vent is fitted with a manually operable pull member so as to allow manual operation of the valve closure means that control the flow of air through the air vent and flow diverting conduit.

10. The apparatus of claim 6 wherein the valve closure structure comprises a float.

11. The apparatus of claim 6 wherein the conduit connected with the throat portion of the venturi has a number of small orifices at its lower end.

12. An apparatus of comprising the combination of a wide mouth container and an improved liquid proportioning and dispensing device wherein the proportioning and dispensing device consists of a main conduit, a venturi in said main conduit for effecting a pressure differential determining high and low pressure sides thereof during the flow of liquid therethrough, a flow-diverting conduit connected with the high pressure side of the main conduit and adapted to supply a diverted flow of liquid from the said main conduit to the container, a conduit connected with the throat portion of the venturi in the said main conduit, a metering jet having an orifice inlet and a passage of sufficient diameter relative to said orifice, said metering jet comprising the inlet end portion of said flow-diverting conduit, said orifice being of a predetermined ratio relative to the venturi throat portion, the relationship of the said orifice to the said venturi throat portion being adapted to afford a substantially fixed ratio through a wide range of pressures and flows in the said main conduit, a header adapted for attachment to said container, wherein air vent means is provided and equipped with float valve mechanism that may be manually actuated, said mechanism equipped with valve support structure extending through the air vent means.

* * * * *